(12) United States Patent
Hoffend, Jr. et al.

(10) Patent No.: US 8,098,434 B1
(45) Date of Patent: Jan. 17, 2012

(54) OPTICAL DECOLLIMATOR FOR DAYLIGHTING SYSTEMS

(75) Inventors: Thomas R. Hoffend, Jr., Woodbury, MN (US); David G. Freier, Saint Paul, MN (US); Kenneth A. P. Meyer, Shoreview, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 12/887,776

(22) Filed: Sep. 22, 2010

(51) Int. Cl.
*G02B 17/00* (2006.01)
*G02B 27/00* (2006.01)

(52) U.S. Cl. ........ 359/591; 359/592; 359/593; 359/594; 359/595; 359/596; 362/1; 126/623; 52/200; 136/246

(58) Field of Classification Search ............ 359/591, 359/535, 595, 597, 592, 861; 52/17, 22, 52/200; 362/1; 126/623; 136/246
See application file for complete search history.

(56) References Cited

U.S. PATENT DOCUMENTS

| | | | |
|---|---|---|---|
| 3,732,417 A | 5/1973 | Nordquist | |
| 4,126,379 A * | 11/1978 | Wu | 359/593 |
| 5,295,050 A | 3/1994 | Helstern et al. | |
| 5,540,216 A * | 7/1996 | Rasmusson | 126/683 |
| 5,945,916 A | 8/1999 | Collot | |
| 6,206,544 B1 | 3/2001 | Costa | |
| 6,219,977 B1 * | 4/2001 | Chao et al. | 52/200 |
| 6,256,947 B1 * | 7/2001 | Grubb | 52/200 |
| 6,363,667 B2 * | 4/2002 | O'Neill | 52/200 |
| 7,339,739 B1 * | 3/2008 | Kinney et al. | 359/591 |
| 7,480,101 B2 * | 1/2009 | Lubart et al. | 359/641 |
| 7,506,998 B2 * | 3/2009 | Ansems et al. | 362/245 |
| 7,546,709 B2 * | 6/2009 | Jaster et al. | 52/200 |
| 7,757,444 B1 * | 7/2010 | Halliday | 52/200 |
| 7,907,345 B2 * | 3/2011 | Paulussen et al. | 359/641 |
| 2003/0079422 A1 | 5/2003 | Bracale | |
| 2005/0073756 A1 * | 4/2005 | Poulsen | 359/861 |
| 2005/0265659 A1 | 12/2005 | Miller | |
| 2006/0191566 A1 * | 8/2006 | Schaafsma | 136/246 |
| 2008/0135087 A1 * | 6/2008 | Anikara | 136/246 |
| 2009/0101207 A1 * | 4/2009 | Milbourne et al. | 136/259 |
| 2009/0107540 A1 * | 4/2009 | Milbourne | 136/246 |
| 2010/0091396 A1 | 4/2010 | Hutson et al. | |

FOREIGN PATENT DOCUMENTS

| | | |
|---|---|---|
| DE | 2229120 | 12/1972 |
| FR | 2745365 | 8/1997 |

* cited by examiner

*Primary Examiner* — Clayton E Laballe
*Assistant Examiner* — Kevin Butler

(57) ABSTRACT

A decollimator for a daylighting system includes a conical section having a circular end, a square end, and a conical shape tapering inwardly from the circular end to the square end. A mixing zone section is attached to the square end of the conical section and has a square cross sectional shape of a substantially constant cross sectional dimension. The decollimator also includes either a window with a converging Fresnel lens on the circular end of the conical section, a window with a diverging Fresnel lens on an end of the mixing zone section opposite the conical section, or both. When the conical section receives collimated light, the conical section, the mixing zone section, and the Fresnel lens together decollimate the light and provide the decollimated light out of the mixing zone section.

15 Claims, 2 Drawing Sheets

OPTICAL DECOLLIMATOR FOR DAYLIGHTING SYSTEMS

BACKGROUND

Daylighting systems use sunlight to provide natural lighting of indoor spaces, which can result in energy conservation and savings. We consider a daylighting system that includes a collector located outside of a building to collect and possibly concentrate sunlight and light ducts to transport and distribute the collected light inside the building. The light from the collector is typically collimated either intentionally for efficient transport to avoid or reduce losses through the light ducts or unintentionally as an artifact of the design of the collector. For effective distribution and extraction of the light in indoor spaces, the light must be decollimated to a controlled distribution of angles A need exists for a decollimator to efficiently and controllably decollimate light in daylighting systems.

SUMMARY

A decollimator for a daylighting system, consistent with the present invention, includes a conical section having a circular end, a square end, and a conical shape tapering inwardly from the circular end to the square end. A mixing zone section is attached to the square end of the conical section and has a square cross sectional shape of a substantially constant cross sectional dimension. The decollimator also includes either a window with a converging Fresnel lens on the circular end of the conical section, a window with a diverging Fresnel lens on an end of the mixing zone section opposite the conical section, or both. When the conical section receives collimated light, the conical section, the mixing zone section, and the Fresnel lens together decollimate the light and provide the decollimated light out of the mixing zone section.

BRIEF DESCRIPTION OF THE DRAWINGS

The accompanying drawings are incorporated in and constitute a part of this specification and, together with the description, explain the advantages and principles of the embodiment. In the drawings.

DETAILED DESCRIPTION

Figure 1:
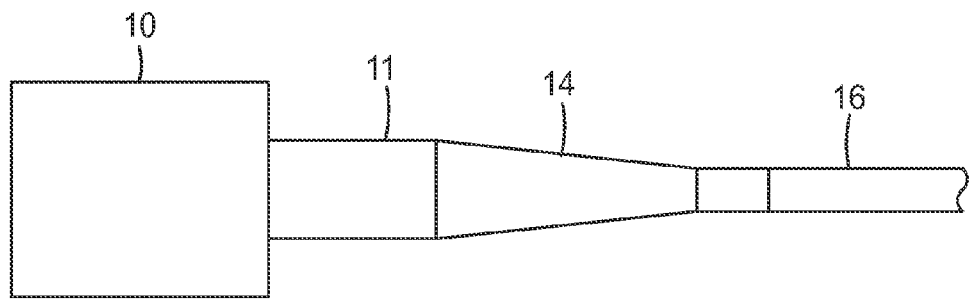
FIG. 1 is a diagram of a daylighting system.

FIG. 1 is a diagram of a daylighting system, which includes a daylight collector 10, a light transport duct 11, a decollimator 14, and a light duct 16. Collector 10 collects daylight outside of a building and provides concentrated and collimated daylight to light transport duct 11 for transport inside of a building. Decollimator 14 decollimates the daylight for distribution, and light duct 16 distributes the daylight within the building. Light duct 16 includes apertures at various locations to distribute the daylight from the light duct into the indoor spaces of the building. Examples of a daylighting system and a daylighting collector (concentrator) are described in, respectively, U.S. Pat. No. 7,339,739 and U.S. Patent Application Publication No. 2010/0091396, both of which are incorporated herein by reference as if fully set forth.

Figure 2:
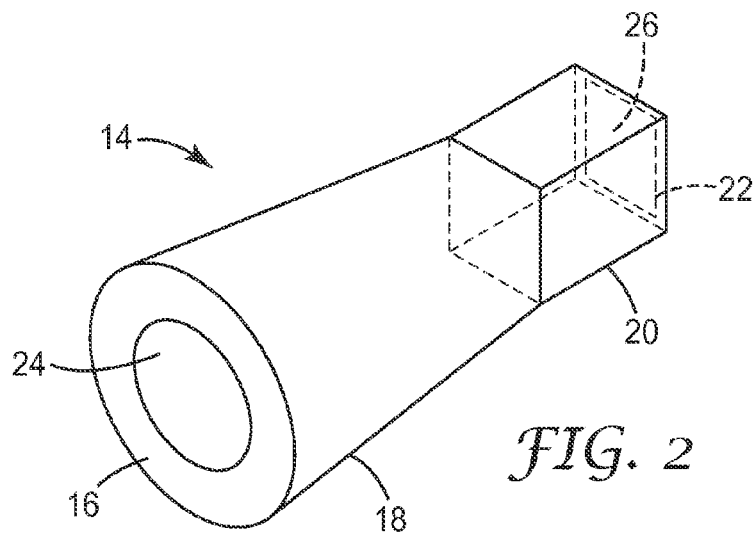
FIG. 2 is a front perspective view of a decollimator.
Figure 3:
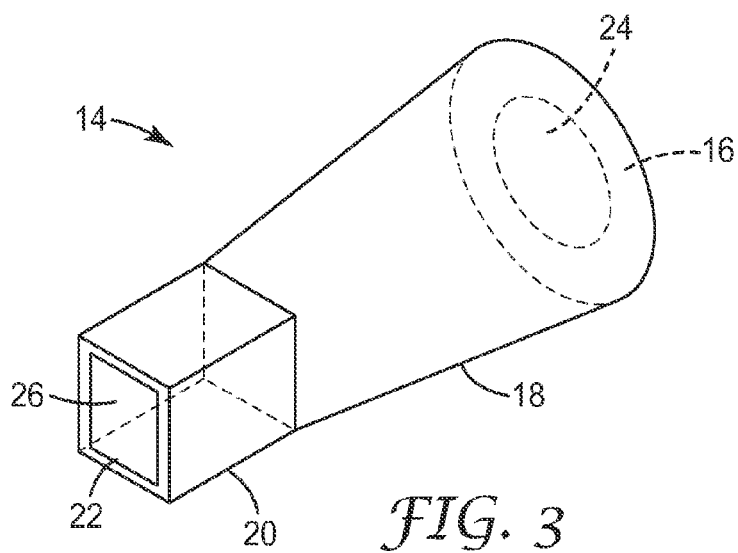
FIG. 3 is a rear perspective view of a decollimator.
Figure 4:
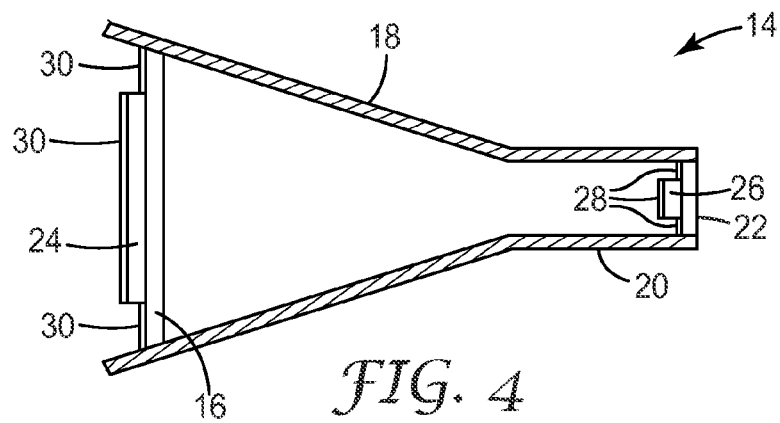
FIG. 4 is a side sectional view of a decollimator.
Figure 5:
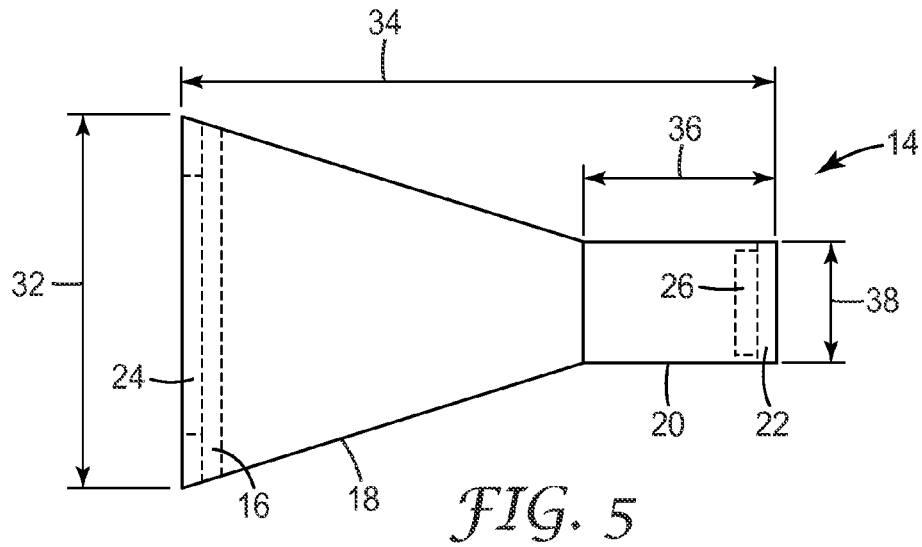
FIG. 5 is a side view of a decollimator.
Figure 6:
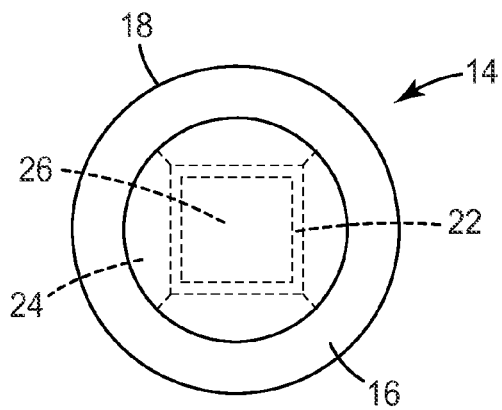
FIG. 6 is a front view of a decollimator.
Figure 7:
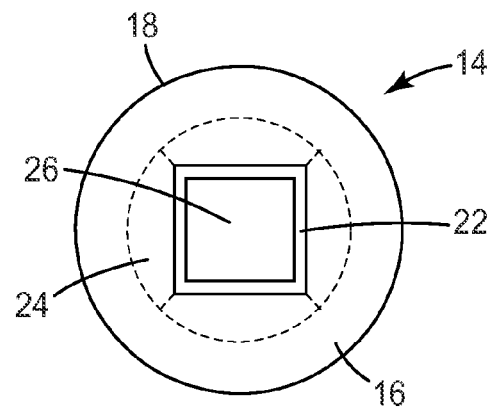
FIG. 7 is a rear view of a decollimator.

FIGS. 2-7 are diagrams of decollimator 14. FIGS. 2 and 3 are front and rear perspective views, respectively. FIG. 4 is a side sectional view. FIG. 5 is a side view with the lengthwise sides being generally symmetrical. FIGS. 6 and 7 are front and rear views, respectively.

As shown in FIGS. 2-7, decollimator 14 includes a generally conical section 18 connected with a square mixing zone section 20. Conical section 18 includes an entrance having a circular cross sectional shape tapering inwardly to a second end having a square cross sectional shape. Circular and square cross sectional shapes means that the entrance and exit at least approximate a circular and square shape, respectively.

Mixing zone section 20 is a square tube of a substantially constant cross sectional dimension with a first end connected to conical section 18 and a second end forming an exit having a square cross sectional shape. Mixing zone section 20 can have different cross sectional shapes depending upon, for example, a cross sectional shape of light duct 16 to which it is connected. Sections 18 and 20 can be implemented with, for example, aluminum or galvanized steel. A film having high optical reflectivity, for example at least 91% reflective in the visible spectrum, can optionally be laminated or otherwise affixed on the inside (interior surface) of sections 18 and 20. An example of such a reflective film is the Enhanced Specular Reflector film product from 3M Company.

The entrance can include a window 16 having a converging Fresnel lens 24 partially covering window 16 and having a circular shape. The exit can include a window 22 having a diverging Fresnel lens trimmed to a square shape to completely or nearly cover exit window 22. Windows 16 and 22 can be implemented with any optically clear material transmitting visible light such as glass. The Fresnel lenses can be laminated or otherwise affixed to the windows, or the Fresnel lenses and windows can optionally be integrally formed together. Diverging Fresnel lens 26 can be implemented with, for example, a "negative focal length" Fresnel lens with a focal length preferable between 18 and 22 inches for a 12 inch by 12 inch light duct. Although decollimator 14 is shown with and can include both the entrance Fresnel lens 24 and exit Fresnel lens 26, it typically would include only the entrance Fresnel lens and window or only the exit Fresnel lens and window. The entrance window 16 and Fresnel lens 24 can include an optional antireflective coating 30, and the exit window 22 and Fresnel lens 26 can include an optional antireflective coating 28. The antireflective coatings 28 and 30 are only shown in FIG. 4 for ease of illustration.

In use decollimator 14 receives collimated light at the entrance of conical section 18 and provides decollimated light at the exit end of mixing zone section 20. Decollimation is achieved using a combination of the tapered duct 18 having a circular cross section on its entrance aperture, a square cross section on its exit aperture, and a converging Fresnel lens on the entrance aperture or a diverging Fresnel lens on the exit aperture. Additional decollimation can be achieved using mixing section 20 to further disperse the decollimated light prior to exiting decollimator 14.

The following are exemplary dimensions for decollimator 14 with reference to FIG. 5: a 2 foot diameter 32 for the conical section entrance; a 4 foot overall length 34; a 12 inch square dimension 38 for mixing zone section 20 and the exit; and at least a 22.5 inch length 36 for a 12 inch by 12 inch mixing zone section 20 and 15 degree collimation.

The invention claimed is:

1. A decollimator for a daylighting system, comprising:
   a conical section having a first end with a circular cross sectional shape, a second end with a square cross sectional shape opposite the first end, and a conical shape tapering inwardly from the first end to the second end of the conical section;
   a mixing zone section having a first end connected to the second end of the conical section, a second end opposite the first end, and a square cross sectional shape of a substantially constant cross sectional dimension;
   a window on the first end of the conical section, the window transmitting visible light; and
   a converging Fresnel lens on the window and partially covering the window,
   wherein when the first end of the conical section receives collimated light, the conical section, the mixing zone section, and the Fresnel lens together decollimate the collimated light and provide the decollimated light at the second end of the mixing zone section.

2. The decollimator of claim 1, wherein the conical section and the mixing zone section are composed of aluminum or galvanized steel.

3. The decollimator of claim 1, further comprising a film having high optical reflectivity affixed to an interior surface of the conical section and the mixing zone section.

4. The decollimator of claim 1, further comprising an antireflective coating on the window and the Fresnel lens.

5. The decollimator of claim 1, wherein the Fresnel lens is laminated to the window.

6. A decollimator for a daylighting system, comprising:
   a conical section having a first end with a circular cross sectional shape, a second end with a square cross sectional shape opposite the first end, and a conical shape tapering inwardly from the first end to the second end of the conical section;
   a mixing zone section having a first end connected to the second end of the conical section, a second end opposite the first end, and a square cross sectional shape of a substantially constant cross sectional dimension;
   a window on the second end of the mixing zone section, the window transmitting visible light; and
   a diverging Fresnel lens on the window and completely or nearly covering the window,
   wherein when the first end of the conical section receives collimated light, the conical section, the mixing zone section, and the Fresnel lens together decollimate the collimated light and provide the decollimated light at the second end of the mixing zone section.

7. The decollimator of claim 6, wherein the conical section and the mixing zone section are composed of aluminum or galvanized steel.

8. The decollimator of claim 6, further comprising a film having high optical reflectivity affixed to an interior surface of the conical section and the mixing zone section.

9. The decollimator of claim 6, further comprising an antireflective coating on the window and the Fresnel lens.

10. The decollimator of claim 6, wherein the Fresnel lens is laminated to the window.

11. A decollimator for a daylighting system, comprising:
    a conical section having a first end with a circular cross sectional shape, a second end with a square cross sectional shape opposite the first end, and a conical shape tapering inwardly from the first end to the second end of the conical section;
    a mixing zone section having a first end connected to the second end of the conical section, a second end opposite the first end, and a square cross sectional shape of a substantially constant cross sectional dimension;
    a first window on the first end of the conical section, the first window transmitting visible light; and
    a converging Fresnel lens on the first window and partially covering the first window,
    a second window on the second end of the mixing zone section, the second window transmitting visible light; and
    a diverging Fresnel lens on the second window and completely or nearly covering the second window,
    wherein when the first end of the conical section receives collimated light, the conical section, the mixing zone section, the converging Fresnel lens, and the diverging Fresnel lens together decollimate the collimated light and provide the decollimated light at the second end of the mixing zone section.

12. The decollimator of claim 11, wherein the conical section and the mixing zone section are composed of aluminum or galvanized steel.

13. The decollimator of claim 11, further comprising a film having high optical reflectivity affixed to an interior surface of the conical section and the mixing zone section.

14. The decollimator of claim 11, further comprising an antireflective coating on the first window, the second window, the converging Fresnel lens, and the diverging Fresnel lens.

15. The decollimator of claim 11, wherein the converging Fresnel lens is laminated to the first window, and the diverging Fresnel lens is laminated to the second window.

\* \* \* \* \*